July 4, 1933. G. H. CURTISS 1,916,967

FLEXIBLE COUPLING FOR VEHICULAR STRUCTURES

Filed June 8, 1928

INVENTOR.
GLENN H. CURTISS.
BY
ATTORNEY.

Patented July 4, 1933

1,916,967

UNITED STATES PATENT OFFICE

GLENN H. CURTISS, OF COUNTRY CLUB ESTATES, FLORIDA, ASSIGNOR, BY MESNE ASSIGNMENTS, TO CURTISS AEROCAR COMPANY, INC., OF OPA LOCKA, FLORIDA, A CORPORATION OF FLORIDA

FLEXIBLE COUPLING FOR VEHICULAR STRUCTURES

Application filed June 8, 1928. Serial No. 283,881.

My invention relates to couplings and more particularly to a flexible coupling especially designed as a connection between a power driven vehicle (either road, rail, air, or water) and a trailer or semi-trailer.

An object of the invention is to embody, in said coupling, an annular or circular tire-like pneumatic tube (or any equivalent pneumatic device) by means of which all operating shocks, in all directions, are completely absorbed and dissipated.

A further object of the invention is to mount said tube and its accompaniments on an auxiliary or supplimentary support likewise yielding in its nature.

Other and further objects and advantages of the invention will be hereinafter set forth.

In the drawing, wherein like reference characters denote like or corresponding parts, Fig. 1 is a side elevation in which, by way of example, a trailer is shown coupled to an automobile;

Figure 1:
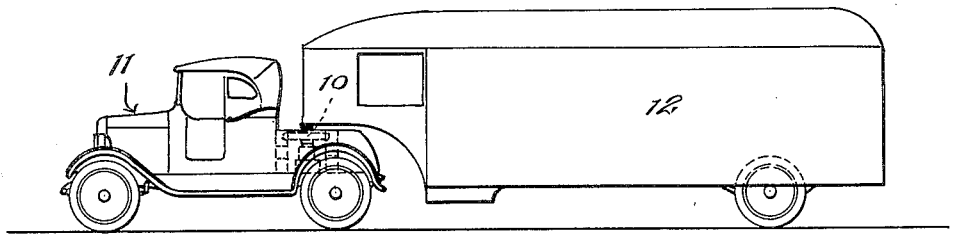
Figure 2:
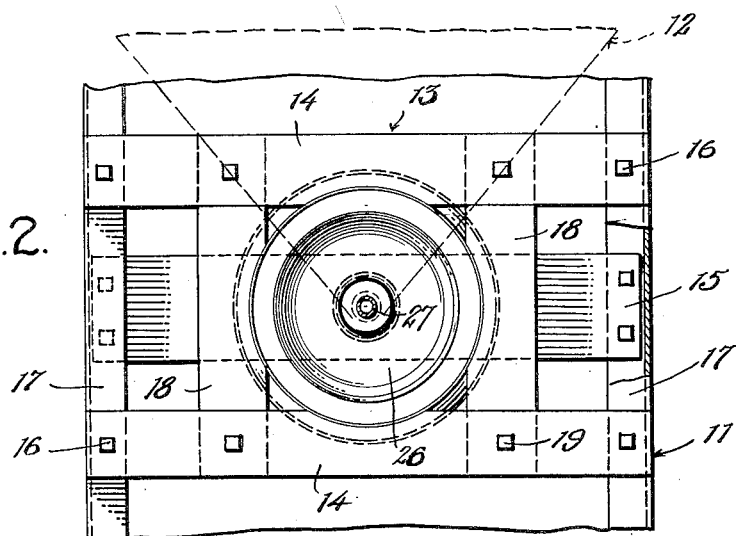
Fig. 2 is a plan view of the coupling.

In the embodiment of the invention selected for illustration the coupling, designated in its entirety as 10, is shown as a connection between an automobile 11 and a trailer 12. The automobile 11, at a point rearwardly removed from the transverse center line thereof, has mounted thereon a retaining frame 13. Said frame 13 is preferably a built-up frame. It comprises (see Fig. 2) two end transverse frame members 14 and a single center transverse frame member 15, all of which said frame members are bolted as at 16 to the side sills 17 of the automobile chassis. It also includes two longitudinal frame members 18 bolted as at 19 to the end frame members 14 to provide in the aggregate a box-like retaining frame across the bottom of which the center transverse frame member 15 extends. Each of said frame members 14 and 18 have formed therein adjacent to the top of the retaining frame an arcuate laterally facing groove-like depression 20, which depressions or grooves, collectively, define an annular or circular groove within which the outer periphery of the tire-like tube 21 is adapted to engage. Said grooves or depressions 20, if desired, may be metal lined as indicated at 22.

The tire-like rubber tube 21 (of which an aeroplane tire is the best illustration) is preferably inflatable and deflatable. It is held, when inflated, in engagement with said annular grove by means of a wheel structure 23 including a hub portion 24, a rim 25, and a connecting web portion 26.

Figure 3:
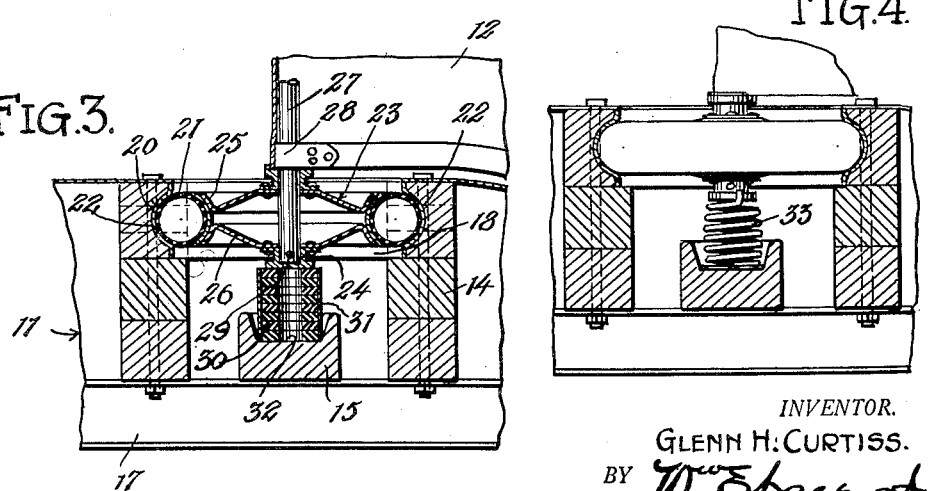
Fig. 3 is a longitudinal vertical sectional view.

Within the hub 24 of the wheel structure 23 a coupling pin or king pin 27 is fitted. Said pin is carried entirely thru the hub 24 and at its outer or upper end is extended well above and well beyond the corresponding face of the wheel. At its extended or upper end said pin 27 is carried thru fittings 28 (only one of which is shown) mounted at the forward end of the trailer. The trailer being thus mounted on said pin, may swing laterally about said pin 27 as an axis. At its opposite or lower end said pin is fastened as at 29 to the hub 24 of the wheel. Said hub (see Fig. 3) is preferably, tho not necessarily, supported on its underside by a supplementary support 30 in the form of a rubber cushion. This cushion 30 preferably comprises a tier of rubber discs, usually called "doughnuts", held one upon the other by a metal sleeve 31 seated in a depression 32 formed in the center transverse frame member 15 at the bottom of the retaining frame. Thus supported, the extent to which the wheel structure 23 can be vertically displaced is yieldingly restricted.

Figure 4:
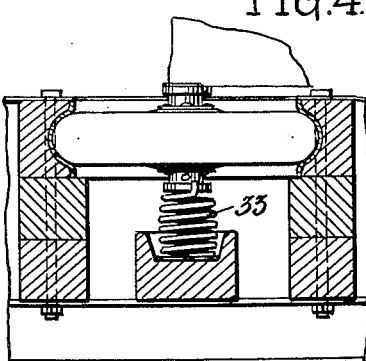
Fig. 4 is a view similar to Fig. 3 in which a modified type of coupling is illustrated.

In the modification of Fig. 4, instead of a tier of rubber discs, a compression spring 33 is provided. Its function is identical with that of the discs 30.

It is to be understood that the parts comprising the coupling, if desired, may be reversed. The wheel structure 23, instead of being directly mounted on the automobile 11 may be mounted on the trailer 12. In either event, the pneumatic tube, placed as indicated, will completely and effectively absorb and dissipate all operating shocks, whether fore and aft, cross-wise, or vertical. Moreover, the tube in conjunction with the cushion support will properly absorb all twisting strains due to the various angles assumed by the coupled vehicles in travel. The weight of the trailer end is directly borne by the hub 24 of the wheel.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a coupling for vehicular structures, a vertical axis coupling pin bearing mounted upon one said vehicular structure, a vertical axis coupling pin bearing mounted upon the other said vehicular structure, a yielding fluid support for one said coupling pin bearing mounted upon one said vehicular structure, and a coupling pin extending from one to the other of and engaging in said bearings and about which said vehicular structures are adapted to laterally swing.

2. In a coupling for vehicular structures, a substantially vertically disposed coupling pin extending from one to the other of said vehicular structures and about the axis of which said vehicular structures are adapted to laterally swing, a substantially vertical axis coupling pin bearing mounted upon one said vehicular structure and within which said coupling pin is adapted to engage, a subtantially vertical axis coupling pin bearing mounted upon the other said vehicular structure and within which said coupling pin is adapted to engage, and an annular pneumatic cushioning means carried by one said vehicular structure and within the embrace of which one said bearing is yieldingly held.

3. In a coupling for vehicular structures, a retaining frame fixed in its relation to one said vehicular structure, a non-rotatable wheel including a hub portion and a rim, a pneumatic tube mounted on said rim and engaging in said frame, and a substantially vertically disposed coupling pin engaging in said hub portion and to which the other said vehicular structure is fastened.

4. In a coupling for vehicular structures, a retaining frame fixed in its relation to one said vehicular structure, a non-rotatable wheel including a hub portion and a rim, a pneumatic tube mounted on said rim and engaging in said frame, a substantially vertically disposed coupling pin engaging in said hub portion and to which the other said vehicular structure is fastened, and a yielding means bearing on said hub portion at one end of said coupling pin.

5. In a coupling for vehicular structures, a retaining frame fixed in its relation to one said vehicular structure, a coupling pin to which the other said vehicular structure is directly fastened and about the axis of which said vehicular structures are adapted to laterally swing, and pneumatic means encircling said coupling pin and engaging in said retaining frame to yieldingly hold said coupling pin in a substantially up-right position.

6. In a coupling for vehicular structures, a pin fastened to one of the vehicular structures, a bearing through which said coupling pin is inserted, an annular inflatable and deflatable pneumatic tube engaging said bearing, and a support for said tube secured to the second vehicle, said tube being inflatable and deflatable to establish and disestablish respectively a yielding connection between said vehicles.

7. In a coupling for vehicular structures, a coupling pin connected to one of the said vehicular structures, and means comprising an inflatable and deflatable pneumatic tube for resiliently connecting said coupling pin to the second vehicular structure and for varying at will the sensitiveness of the yielding connection between the vehicular structures.

8. In a coupling for vehicular structures, a coupling pin engaged with one of the vehicular structures at one end, a bearing in which the other end of the coupling pin is inserted, and an annular inflatable and deflatable pneumatic tube engaging the said bearing and connected with the second vehicular structure, both of said vehicular structures being adapted to laterally swing about the coupling pin and the annular tube providing when inflated a yielding connection between the vehicular structures.

9. In combination a towing vehicle, a trailer vehicle, a non-rotatable retaining frame secured to said towing vehicle, a coupling pin directly fastened to said trailer vehicle and means carried in said frame and comprising a pneumatic tube for yieldingly holding said coupling pin in a substantially vertical position.

10. In combination a towing vehicle, a trailer vehicle, a retaining frame connected to one of said vehicles and having formed therein an annular groove, a coupling pin attached to the other said vehicle, and means including a pneumatic tube engaging in said groove for yieldingly holding said coupling pin in a substantially vertical position.

11. In combination, a towing vehicle, a trailer vehicle, a retaining frame attached to one of said vehicles, a non-rotatable wheel including a hub portion and a rim, a pneumatic tire mounted on said rim and engaging in said frame, and a coupling pin engaging in said hub portion and connected to the other vehicle.

12. A yielding connection between a towing vehicle and a trailer vehicle supported thereon characterized by the fact that the trailer vehicle is connected to the towing vehicle through the intervention of pneumatic means, said pneumatic means comprising an inflatable annular tube so arranged that it absorbs all radial shocks occurring at the coupling of the two vehicles.

13. In combination a towing vehicle, a trailer vehicle, a coupling pin bearing mounted upon one of said vehicular structures, an annular pneumatic cushioning means carried by the other said vehicular structure, a second coupling pin bearing mounted in said annular pneumatic cushioning means, and a coupling pin inserted in both of said coupling pin bearings and about which said vehicular structures are adapted to laterally swing.

14. In combination, a vehicular structure; a second vehicular structure adapted to be coupled thereto; and means for coupling said second named vehicular structure to said first named vehicular structure, said last named means comprising an annular pneumatic tube, a retaining means carried by one of said structures for holding said tube in place, and a coupling pin engaging in said retaining means.

15. In combination, a vehicular structure; a second vehicular structure; and means for coupling said second named vehicular structure to said first named vehicular structure comprising an annular pneumatic tube adapted to be held in a substantially horizontally flat position upon one of said structures, and a coupling pin yieldingly held in a substantially vertical position by said tube and to which the other said structure is fastened.

16. In combination a vehicular structure; a second vehicular structure adapted to be coupled thereto; and means for flexibly coupling said second named vehicular structure to said first named vehicular structure, comprising a coupling pin, and means including an annular pneumatic tube for yieldingly holding said pin in a substantially vertical position.

17. In combination a vehicular structure; a second vehicular structure adapted to be coupled thereto; and means for flexibly coupling said second named vehicular structure to said first named vehicular structure comprising a coupling pin, means completely encircling said pin for yieldingly resisting its radial displacement, and means engaging beneath said pin for yieldingly resisting its axial displacement.

18. In combination a vehicular structure; a second vehicular structure adapted to be coupled thereto; means for flexibly coupling said second named vehicular structure to said first named vehicular structure comprising a coupling pin, pneumatic means encircling said pin for yieldingly resisting its radial and axial displacement, and means in addition to said pneumatic means for further yieldingly resisting axial displacement of said pin.

19. In combination a vehicular structure; a second vehicular structure adapted to be coupled thereto; and means for flexibly coupling said second named vehicular structure to said first named vehicular structure comprising a retaining frame carried by one of said structures, an annular pneumatic tube engaging in said frame, a coupling pin to which the other said structure is fastened, and means engaging within the embrace of said pneumatic tube for yieldingly holding said pin in place.

20. In combination a towing vehicle, a trailer vehicle, a coupling pin secured to one of said vehicles, and means comprising an annular pneumatic tube connected to the other said vehicle for yieldingly holding said pin in a substantially vertical position and for cooperating therewith to couple said trailer vehicle to said towing vehicle.

21. In combination a towing vehicle, a trailer vehicle, a coupling pin secured to one of said vehicles, pneumatic means connected to the other said vehicle and encircling said pin for yieldingly resisting its radial displacement, and means also secured to said second vehicle and acting in addition to said pneumatic means for further yieldingly re-resisting axial displacement of said pin.

22. In combination a vehicular structure; a second vehicular structure adapted to be coupled thereto; and means for flexibly coupling said second named vehicular structure to said first named vehicular structure comprising a coupling pin, pneumatic means encircling said pin for yieldingly resisting its radial displacement, and means in addition to said pneumatic means for yieldingly resisting axial displacement of said pin.

23. In combination, a towing vehicle, a trailer vehicle, means for pivotally connecting said vehicles together including a coupling pin, pneumatic means connected to one of said vehicles and encircling said pin for yieldingly resisting its radial displacement, and additional means also secured to said last mentioned vehicle for yieldingly resisting axial displacement of said pin.

24. In combination a vehicular structure; a second vehicular structure adapted to be coupled thereto; and means for flexibly coupling said vehicular structures together comprising a coupling pin and means completely surrounding said pin for yieldingly resisting its radial displacement uniformly in all directions.

25. In combination a vehicular structure; a second vehicular structure adapted to be coupled thereto; and means for flexibly coupling said vehicular structures together comprising an articulated connecting means and means completely surrounding said connecting means for uniformly cushioning the draft action in all angular positions of said articulated connecting means.

26. A coupling mechanism for connecting two vehicles together for articulate tractor-trailer operation including an annular pneumatic cushion positioned coaxially with the articulate connection of the two vehicles so as to cushion the draft action in all angular positions of the vehicles.

27. A coupling mechanism for connecting two vehicles together for articulate tractor-trailer operation including an annular pneumatic cushion so positioned as to cushion the draft action in all angular positions of the vehicles.

28. In a vehicular combination wherein two vehicles are connected together for articulated tractor trailer operation, coupling mechanism for connecting the two vehicles which comprises a horizontally positioned wheel with a resilient tire, said wheel being non-rotatably carried by one of said vehicles, a normally upright stem engaged in the hub of said wheel and having its opposite ends respectively connected to said vehicles.

29. In a vehicular combination wherein two vehicles are connected together for articulated tractor trailer operation, coupling mechanism for connecting the two vehicles which comprises a horizontally positioned wheel with a resilient tire, non-rotatably secured by its tread portion to one of said vehicles, a normally upright stem engaged in the hub of said wheel and having one end connected to said wheel supporting vehicle for oscillatory movement in all directions, and means to releasably couple the opposite end of said stem to the other vehicle.

30. In a vehicular combination wherein two vehicles are connected together for articulated tractor trailer operation, coupling mechanism for connecting the two vehicles which comprises a load supporting stem connected at its opposite ends to the respective vehicles, means to cushion shocks acting transversely of the stem and means to cushion shocks acting longitudinally of the stem, whereby all draft, dirigible, vertical, and angular movements of one vehicle with respect to the other are cushioned.

31. In combination a vehicular structure; a second vehicular structure adapted to be coupled thereto; and means for flexibly coupling said vehicular structures together for uniformly cushioned draft action in all articulate positions of the vehicles comprising a coupling pin mounted for an oscillatory movement in all directions with respect to one vehicular structure and an annular resilient cushion member positioned around the pin, the draft action between the vehicles being cushioned solely by said member.

32. In combination a vehicular structure; a second vehicular structure adapted to be coupled thereto; and coupling means for flexibly coupling said vehicular structures together for uniformly cushioned draft action in all articulate positions of the vehicles comprising a coupling pin, an annular resilient cushion member positioned around the pin, the draft action between the vehicles being cushioned solely by said annular member, and a separate cushioning support positioned beneath the coupling means arranged to relieve the annular member from a substantial portion of the vertical load of the trailer imposed on said tractor through said coupling means.

In testimmony whereof I hereunto affix my signature.

GLENN H. CURTISS.